(12) United States Patent
Kanemoto (10) Patent No.: US 8,593,686 B2
(45) Date of Patent: Nov. 26, 2013

(54) IMAGE SCANNING APPARATUS, COMPUTER READABLE MEDIUM, AND IMAGE STORING METHOD ADD SCANNED IMAGE DATA INTO AN IMAGE FILE STORING AN EXISTING IMAGE DATA ASSOCIATED WITH AN ATTRIBUTE VALUE OF THE EXISTING IMAGE DATA

(75) Inventor: Ayako Kanemoto, Nisshin (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 158 days.

(21) Appl. No.: 13/044,606

(22) Filed: Mar. 10, 2011

(65) Prior Publication Data

US 2011/0317181 A1 Dec. 29, 2011

(30) Foreign Application Priority Data

Jun. 29, 2010 (JP) ................ 2010-147825

(51) Int. Cl.
*G06F 3/12* (2006.01)
*G06F 15/00* (2006.01)
*G06F 7/00* (2006.01)
*G06F 12/00* (2006.01)
*G06F 3/00* (2006.01)
*G06F 13/28* (2006.01)
*H04N 1/60* (2006.01)
*H04N 1/04* (2006.01)
*G06K 15/00* (2006.01)

(52) U.S. Cl.
USPC ............. 358/1.9; 358/1.1; 358/1.18; 358/2.1; 358/474; 707/711; 707/821; 710/9; 710/26

(58) Field of Classification Search
USPC .......... 358/1.9, 448, 403, 1.6, 1.1, 3.23, 3.24, 358/1.15, 1.18, 501, 401, 474, 487, 2.1; 715/200, 204, 206, 225, 234, 248, 249, 715/253, 259, 745, 747, 793, 807, 838; 707/616, 642, 661, 672, 673, 677, 706, 707/711, 716, 724, 736, 741, 752, 753, 790, 707/791, 802, 821, 825, 828; 710/3, 4, 9, 710/20, 26, 33, 36, 105; 713/1, 160
See application file for complete search history.

(56) References Cited

U.S. PATENT DOCUMENTS 7,760,378 B2 7/2010 Maruyama
2005/0024679 A1* 2/2005 Yoda et al. .................. 358/1.15
(Continued)

FOREIGN PATENT DOCUMENTS

CN 1516439 A 7/2004
EP 0 863 658 A2 9/1998
(Continued)

OTHER PUBLICATIONS

JP Office Action mailed Apr. 19, 2012, JP Appln. 2010-147825, English translation.
(Continued)

*Primary Examiner* — Benny Q. Tieu
*Assistant Examiner* — Ngon Nguyen
(74) *Attorney, Agent, or Firm* — Banner & Witcoff, Ltd.

(57) ABSTRACT

There is provided an image scanning apparatus including a setting section which sets an image generation condition based on the attribute value of the existing image data stored in the image file; a generator section which scans the manuscript to generate the scanned image data based on the image generation condition set by the setting section; and a storing section which adds the scanned image data generated by the generator section into the image file to store the added image file.

11 Claims, 9 Drawing Sheets

(56) References Cited

U.S. PATENT DOCUMENTS

| | | |
|---|---|---|
| 2005/0057774 A1 | 3/2005 | Maruyama |
| 2007/0002392 A1* | 1/2007 | Ogura .......................... 358/448 |
| 2007/0030519 A1* | 2/2007 | Tojo ............................ 358/1.18 |
| 2007/0206883 A1 | 9/2007 | Kato |
| 2009/0296119 A1 | 12/2009 | Kurihara |

FOREIGN PATENT DOCUMENTS

| | | |
|---|---|---|
| EP | 0863658 A2 | 9/1998 |
| EP | 1 513 058 A2 | 9/2005 |
| JP | 2007-013607 A | 1/2007 |
| JP | 2007-173890 | 7/2007 |
| JP | 2007-288474 | 11/2007 |
| JP | 2007-288475 | 11/2007 |
| JP | 2009-177838 A | 8/2009 |

OTHER PUBLICATIONS

Extended European Search Report dated Aug. 29, 2011, corresponding EP Application 11157729.2.

CN Office Action mailed Aug. 20, 2013, CN Appln. 201110072714.X, English translation.

\* cited by examiner

| | Image Generation Condition | Attribute of Image Data Stored in TIFF File | Attribute of Image Data Stored in PDF File |
|---|---|---|---|
| Read-in Condition | Pixel Configuration | Pixel Configuration | Color RGB |
| | Image Width Resolution | Image Width Resolution | Resolution |
| | Image Height Resolution | Image Height Resolution | |
| | Image Width | Image Width | Size |
| | Image Height | Image Height | |
| Image Processing Condition | Compression Type | Compression Type | — |
| | Image Direction | Image Direction | Page Direction |
| | Brightness, Contrast, Color Balance | — | — |
| Storage Condition | Header and Footer | — | Header and Footer |
| | Watermark | — | Watermark |
| | Thumbnail Image | Thumbnail Image | Thumbnail Image |
| | Recognized Character | — | Recognized Character |
| | — | Generated Time and Date of Image Data | Date |

Fig. 6

|  | HIGH IMAGE QUALITY | LOW IMAGE QUALITY |
|---|---|---|
| IMAGE WIDTH RESOLUTION | 1200dpi | 300dpi |
| IMAGE HEIGHT RESOLUTION | 1200dpi | 300dpi |
| PIXEL CONFIGURATION | COLOR | GRAY SCALE |
| IMAGE WIDTH | LARGE PIXEL NUMBER | SMALL PIXEL NUMBER |
| IMAGE HEIGHT | LARGE PIXEL NUMBER | SMALL PIXEL NUMBER |
| COMPRESSION TYPE | NON-COMPRESSION<br>LZW COMPRESSION (LOSSLESS COMPRESSION)<br>ZIP COMPRESSION (LOSSLESS COMPRESSION)<br>PackBits (LOSSLESS COMPRESSION) | JPEG COMPRESSION (LOSSY COMPRESSION) |

IMAGE SCANNING APPARATUS, COMPUTER READABLE MEDIUM, AND IMAGE STORING METHOD ADD SCANNED IMAGE DATA INTO AN IMAGE FILE STORING AN EXISTING IMAGE DATA ASSOCIATED WITH AN ATTRIBUTE VALUE OF THE EXISTING IMAGE DATA

CROSS REFERENCE TO RELATED APPLICATION

The present application claims priority from Japanese Patent Application No. 2010-147825, filed on Jun. 29, 2010, the disclosure of which is incorporated herein by reference in its entirety.

BACKGROUND OF THE INVENTION

1. Field of the Invention

The present invention relates to an image scanning apparatus, a non-transitory computer readable medium in which a scanner driver is recorded, and an image storing method.

2. Description of the Related Art

Conventionally, there have been known technologies for simplifying users' operation required for a process in which an image data inputted from an image scanner and the like is additionally inserted into an existing file (such as an image file of TIFF format or PDF format).

It is possible to store a plurality of image data of different attribute values (resolution, color/monochrome, and the like) in an image file of TIFF format or PDF format. However, when a plurality of image data of different attribute values are stored in a single image file, and when the images rendered by those image data are output (print or display), there is a fear that some problems such as the variance in image quality may occur due to the difference in attribute values.

SUMMARY OF THE INVENTION

The present invention is accomplished based on such situations as described hereinabove. An object of the present invention is providing an image scanning apparatus which reduces the problem caused by storing image data of different attribute values in one image file, a non-transitory computer readable medium in which a scanner driver is recorded, and an image storing method.

According to a first aspect of the present invention, there is provided an image scanning apparatus which scans a manuscript to obtain a scanned image data and adds the scanned image data into an image file storing an existing image data associated with an attribute value of the existing image data, the apparatus including:

a setting section which sets an image generation condition based on the attribute value of the existing image data stored in the image file;

a generator section which scans the manuscript to generate the scanned image data based on the image generation condition set by the setting section; and a storing section which adds the scanned image data generated by the generator section into the image file to store the added image file.

According to a second aspect of the present invention, there is provided a non-transitory computer readable medium in which a scanner driver to be executed on a computer communicably connected with an image scanning apparatus for scanning a manuscript and outputting a scanned image data is stored, the scanner driver causing the computer to perform the processes of:

a setting process in which an attribute value is acquired from an image file storing an existing image data that is associated with an attribute value of the existing image data, and a read-in condition and an image processing condition based on the acquired attribute value is set;

a control process in which the image scanning apparatus is controlled to output a scanned image data based on the read-in condition;

an image process in which the scanned image data outputted from the image scanning apparatus is processed based on the image processing condition; and a storage process in which the scanned image data processed by the image process is added into the image file.

According to a third aspect of the present invention, there is provided an image storing method for adding a scanned image data generated through scanning of a manuscript into an image file storing an existing image data associated with an attribute value, the method including the steps of:

setting an image generation condition based on the attribute value of the existing image data stored in the image file;

generating the scanned image data through scanning of the manuscript based on the set image generation condition; and adding the scanned image data generated in the step of generating the scanned image data into the image file.

Further, the function of each portion provided in the present invention is realized with hardware resources specifying the function with the configuration per se, software resources specifying the function with the program, or combinations thereof. Further, the functions of the respective portions are not limited to those realized with hardware resources physically independent from each other. Further, the computer readable medium is not limited to portable recording media such as CD-ROM, DVD-ROM and the like, but also includes internal and external memory devices such as ROM, HDD and the like.

DESCRIPTION OF THE PREFERRED EMBODIMENTS

First Embodiment

<An Electrical Configuration of an Image Scanning Apparatus>

A first embodiment of the present teaching will be explained with reference to FIGS. 1 to 9. In the first embodiment, explanations will be made with respect to a so-called multifunctional apparatus, as an example of an image scanning apparatus, which has a print function, a scanner function and a copy function.

Figure 1:
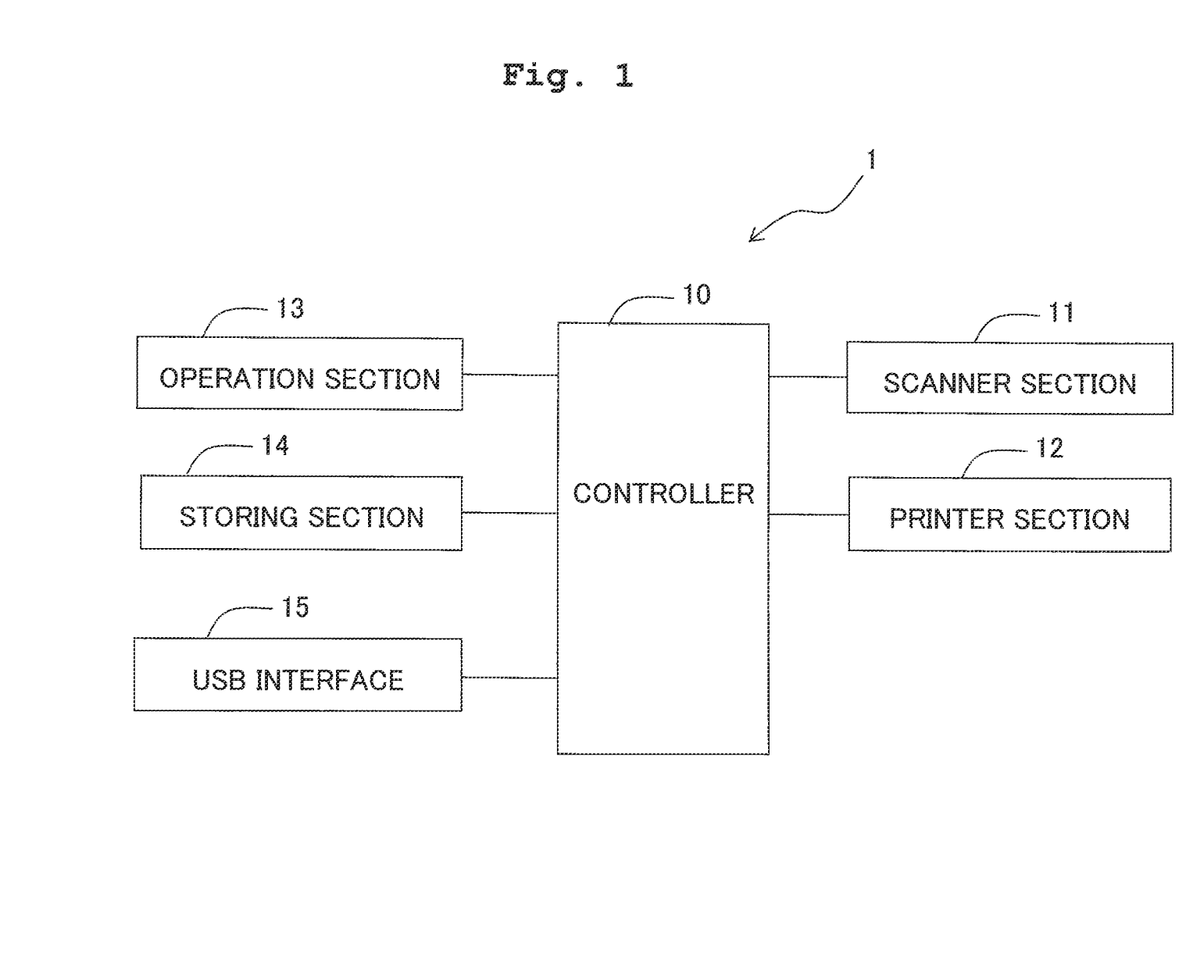
FIG. 1 is a block diagram showing a configuration of an image scanning apparatus in accordance with a first embodiment of the present invention.

A multifunctional apparatus 1 is configured to include a controller 10 (an example of a setting section, a generator section, and a storing section), a scanner section 11 (an example of a generator section), a printer section 12, an operation section 13 (an example of an instruction section), a storing section 14, and a USB interface 15.

The controller 10 is configured to include a CPU, a ROM, a RAM, and the like. The CPU executes various programs stored in the ROM and the storing section 14 to control various sections, of the multifunctional apparatus 1, such as the scanner section 12 and the printer section 12. The ROM stores programs, data and the like by which the CPU executes various processes. The RAM is utilized as a main storage device for the CPU to execute the various processes.

The scanner section 11 scans an object such as paper or a manuscript to generate an image data under the control of the controller 10. The details of the scanner section 11 will be described hereinafter. The printer section 12 forms an image on a recording medium such as paper or the like by the electrophotographic method, the inkjet method or the like under the control of the controller 10.

The storing section 14 is an external storage device utilizing a nonvolatile storage medium such as a hard disk, a flash memory device and the like to store various programs and data. The operation section 13 is configured to include a display device such as a liquid crystal display, an organic EL display and the like, a substantially transparent touch panel to cover the visual surface of the display device, a control circuit to control the touch panel, various manual operation buttons, and the like. A user is able to work with the operation section 13 to operate the multifunctional apparatus 1.

The USB interface 15 is configured as a USB host interface, and connected with USB mass storage devices such as USB memory, USB hard disks, and the like. The first embodiment will be explained with USB memory as an example of the USB mass storage devices.

<A Configuration of the Scanner Section>

Figure 2:
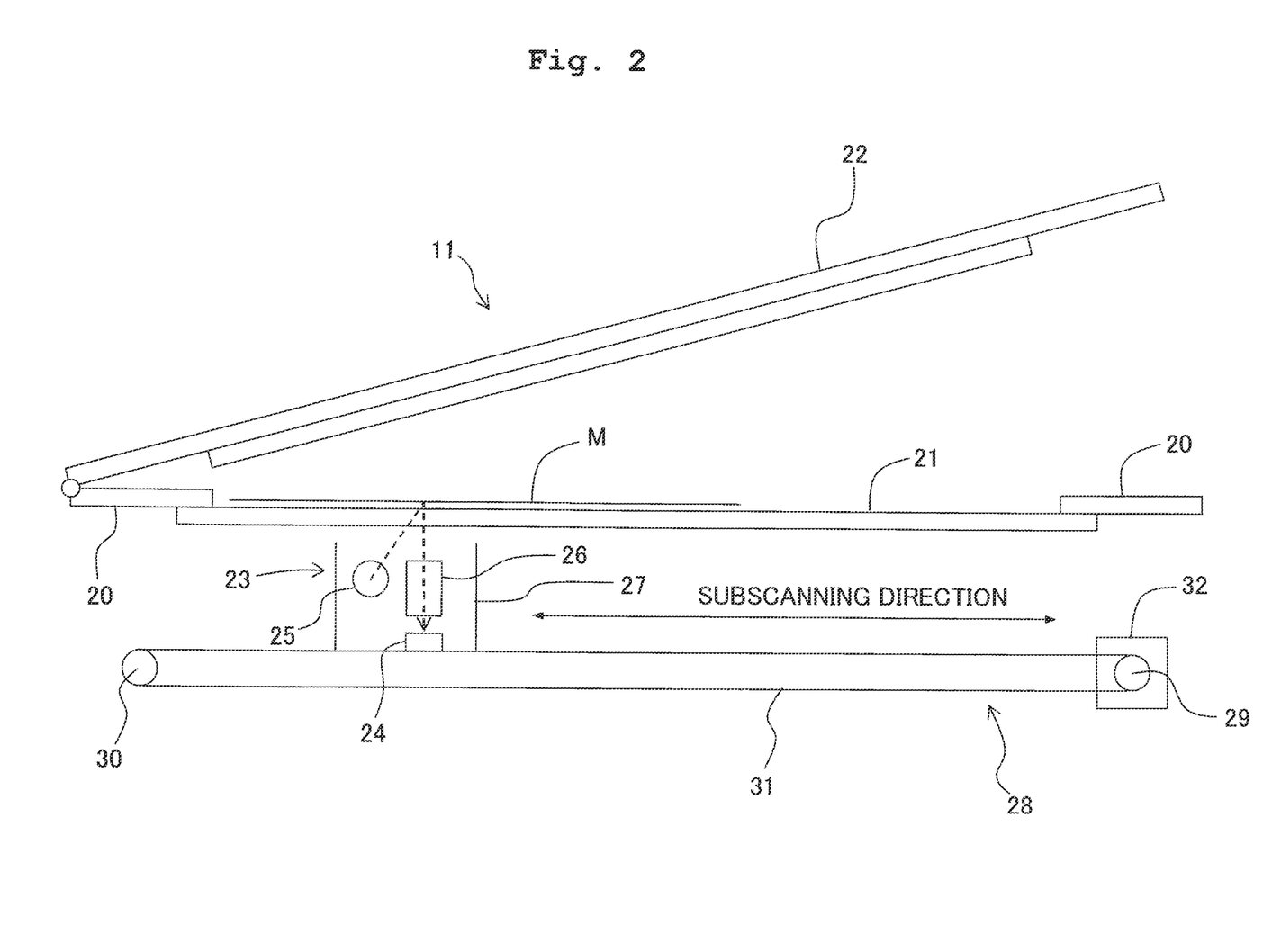
FIG. 2 is a block diagram showing a simplified configuration of a scanner section.

FIG. 2 shows a configuration for scanning a manuscript by a Contact Image Sensor (CIS).

The scanner section 11 is configured to include a platen glass 21, a document cover 22, a scanner device 23, a transport mechanism 28, and the like. The platen glass 21 occludes or closes a rectangular opening formed in the upper portion of a body 20 of the multifunctional apparatus 1 (only partially shown in FIG. 2) from the inside of the body 20.

The document cover 22 is connected with the body 20 so that the document cover 22 is rotatable between an open position to uncover the platen glass 21 and a closed position to cover the platen glass 21. The scanner device 23 includes: an image sensor 24 in which a plurality of light-sensitive elements are linearly arranged in a main scanning direction (a direction perpendicular to the plane of the paper in FIG. 2); a light source 25 including three-color (RGB) light emitting diodes and the like; a rod lens array 26 which forms an image of the light reflected from the manuscript M, onto the light-sensitive element of the image sensor 24; a carriage 27 which is configured to carry the above elements, and the like. The scanner device 23 is configured to scan the manuscript with a first resolution in the main scanning direction (a width-resolution) and a second resolution in a sub-scanning direction (a height-resolution), the first and second resolutions being determined according to a control signal from an ASIC 42.

The transport mechanism 28 includes a driving roller 29, a driven roller 30, a timing belt 31 arranged to wrap around those rollers, a stepping motor 32, a deceleration mechanism or a braking mechanism (not shown) to decelerate the rotational driving power of the stepping motor 32 and transmit the driving power to the driving roller 29, and the like. The transport mechanism 28 moves the scanner device 23 in a reciprocating manner along the plate surface of the platen glass 21 in a sub-scanning direction perpendicular to the main scanning direction.

Figure 3:
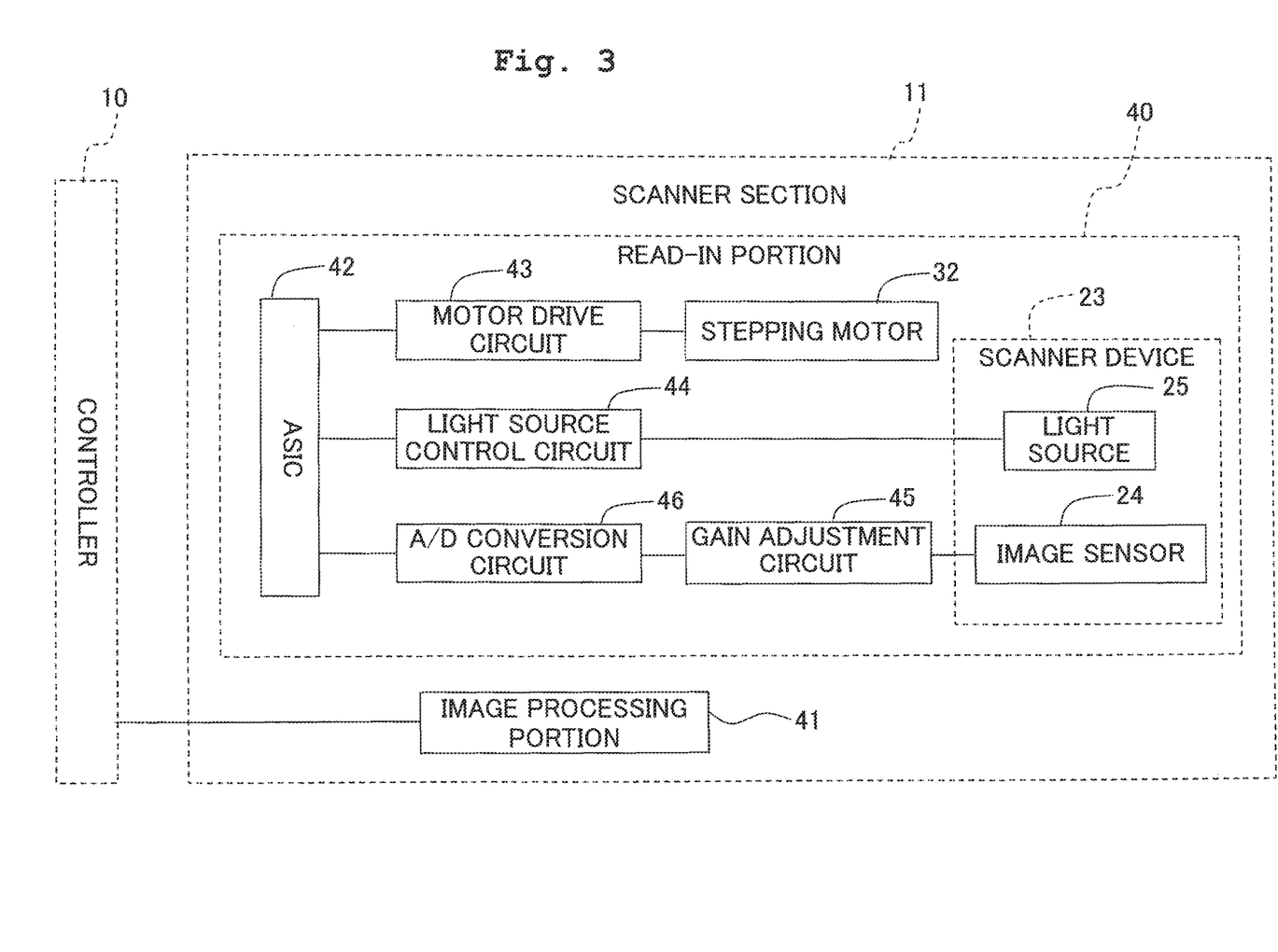
FIG. 3 is a block diagram showing an electrical configuration of the scanner section.

The scanner section 11 includes a read-in portion 40 and an image processing portion 41. In addition to the configuration shown in FIG. 2, the read-in portion 40 further includes the ASIC 42, a motor drive circuit 43, a light source control circuit 44, a gain adjustment circuit 45, an A/D conversion circuit 46, and the like.

The ASIC 42 is connected with the motor drive circuit 43, the light source control circuit 44, the A/D conversion circuit 46, and the like. The ASIC 42 controls these circuits under the control of the controller 10. The ASIC 42 outputs a digital output value (image data) outputted from the A/D conversion circuit 46 to the RAM of the controller 10. Further, a part or all of the functions of the ASIC 42 may also be executed by the controller 10.

The motor drive circuit 43 controls the rotation of the stepping motor 32 based on a control signal outputted from the ASIC 42. The light source control circuit 44 controls the ON/OFF switching and the brightness of the light source 25 based on a control signal outputted from the ASIC 42.

The gain adjustment circuit 45 adjusts a gain of a voltage outputted from the scanner device 23. The A/D conversion circuit 46 converts the voltage amplified by the gain, adjustment circuit 45 into the digital output value (image data). The A/D conversion circuit 46 has a resolution or a resolving power of resolving a voltage into an 8-bit signal (0 to 255).

The image processing portion 41 is configured as an ASIC to carry out various processes for the image data stored in the RAM of the controller 10 under the control of the controller 10, the various processes including, for example, a gamma correction, a shading correction, a conversion of the image width (pixel number in the width direction), a conversion of the image height (pixel number in the height direction), a compression according to a compression type, a rotation of image, a brightness adjustment, a contrast adjustment, and a color balance adjustment. Further, a part or all of these image processes may also be carried out by the controller 10 or by the ASIC 42.

<An Outline of a Scanning and Insertion Process>

The multifunctional apparatus 1 is configured to carry out a "scanning and insertion process" to scan the manuscript to generate an image data, and add or additionally store the scanned image data (the generated image data) into an existing image file. In this "scanning and insertion process", the multifunctional apparatus 1 sets an image generation condition according to the attribute values of the image data stored in the destination image file into which the image data will be inserted, and generates an image data based on the image generation condition.

<Image Files>

In the first embodiment, explanations will be made with examples of a TIFF file and a PDF file as the image files. The TIFF file and PDF file are an example of "an image file storing at least one image data associated with the attribute values of the at least one image data".

Figure 4:
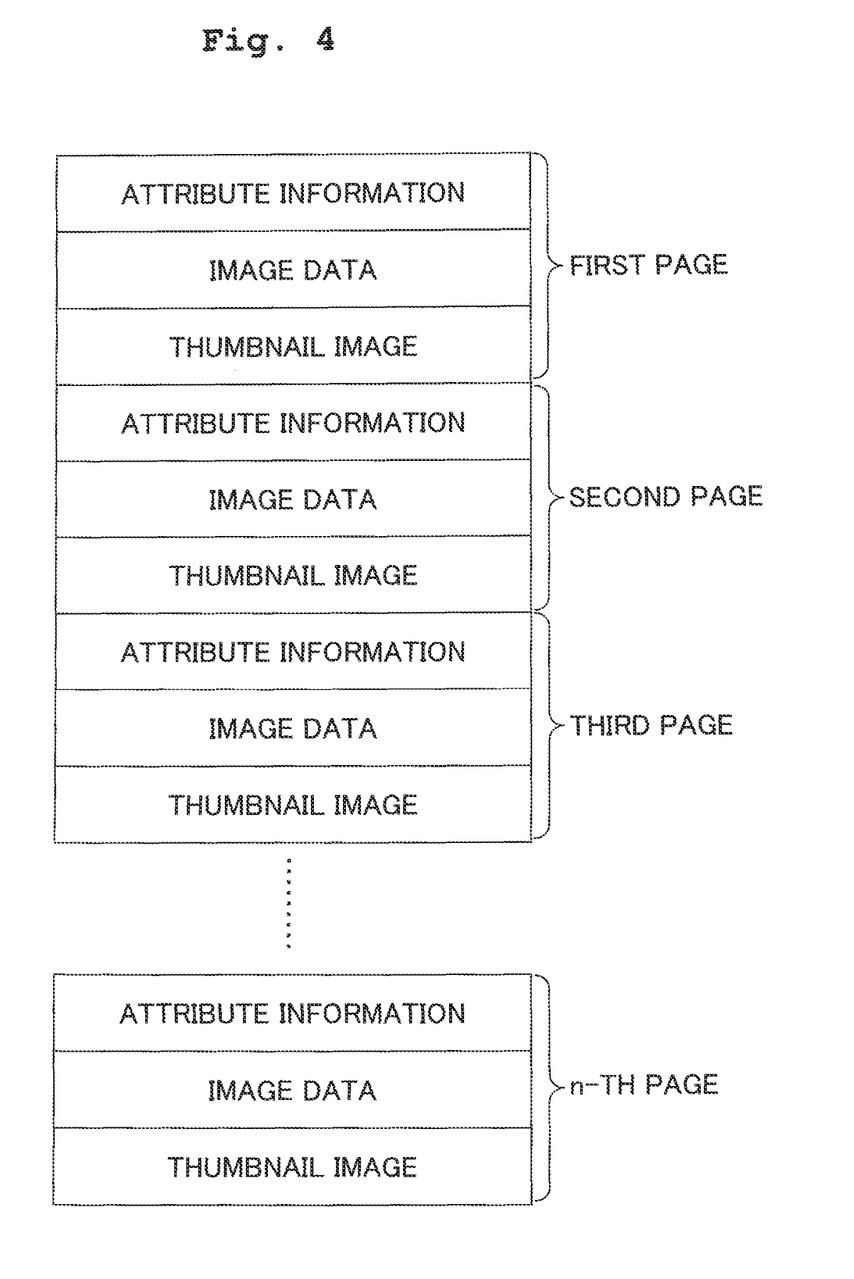
FIG. 4 is a pattern diagram conceptually showing a structure of a TIFF file.

FIG. 4 shows a plurality of attribute values associated with one image data as the "attribute information". Further, it is possible to store a thumbnail image data (thumbnail image) with each of the image data in the TIFF file.

In the following explanations, a "page" refers to an area in which the information of one image data (the attribute information, the image data, and the thumbnail image) is stored inside a TIFF file. Since the conceptual structure of a PDF file is substantively the same as that of a TIFF file, explanations will be omitted for the PDF file.

<Correspondence Between the Image Generation Condition and the Attribute>

Figure 5:
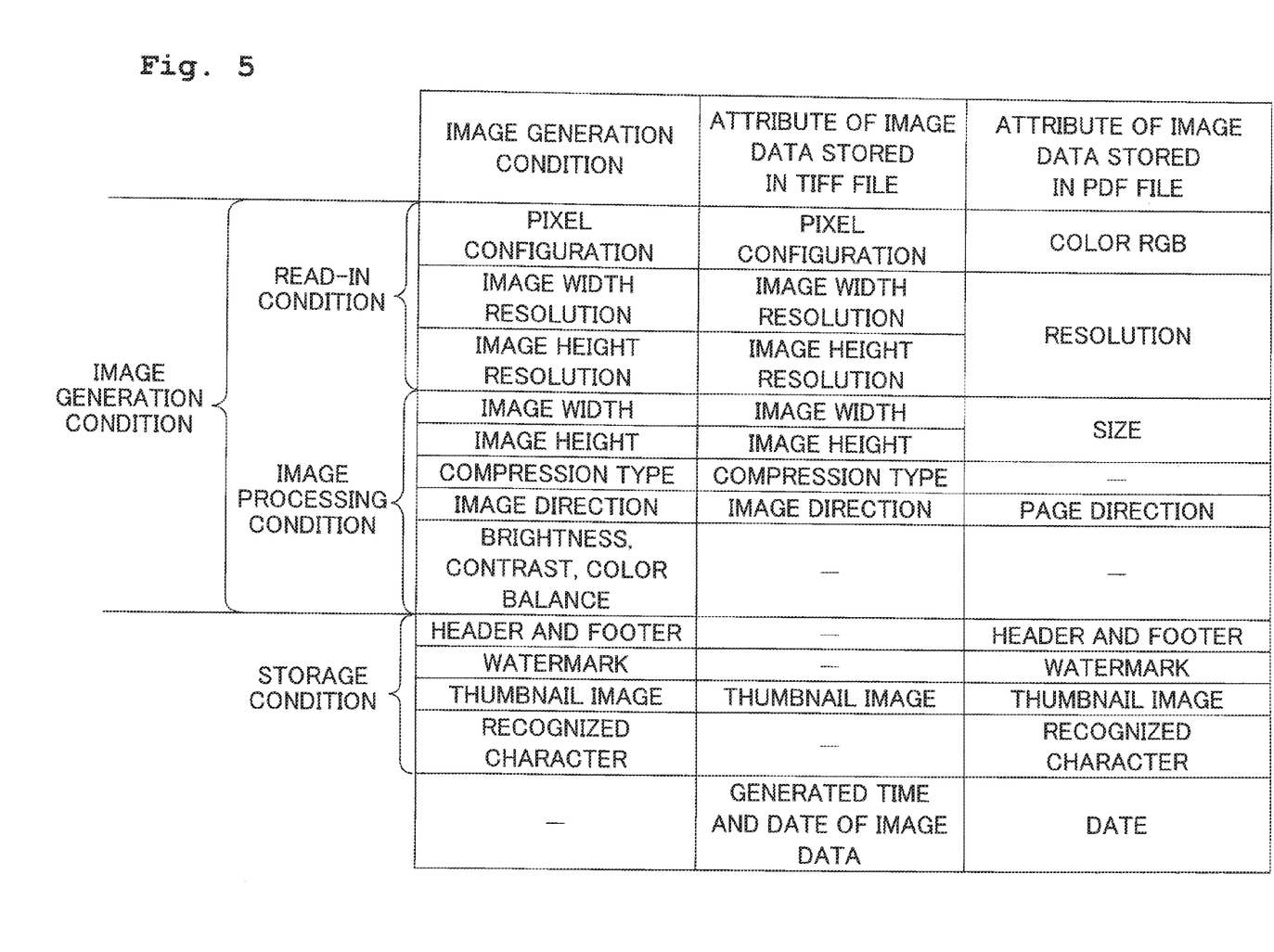
FIG. 5 is a table showing a correspondence relationship between an image generation condition and an attribute of an image data to be stored into an image file.

Further, attribute values of other attributes than those shown in FIG. 5 are also stored in the TIFF file and the PDF file. However, since these attribute values are not utilized to set the image generation condition, they are omitted in FIG. 5. In FIG. 5, a "-" shows that there is no attribute to correspond to that setting item of the image generation condition. The image generation condition includes a condition for controlling the read-in portion 40 (a read-in condition), and a condition for controlling the image processing portion 41 (an image processing condition).

<Read-In Condition>

An example of setting values is shown below for the setting items included in the read-in condition.
1. Image width resolution: (for example, 300 dpi, 600 dpi and 1,200 dpi);
2. Image height resolution: (for example, 300 dpi, 600 dpi and 1,200 dpi); and
3. Pixel configuration: (for example, color and gray scale), Here, the read-in portion 40 of the first embodiment scans a manuscript according to the setting values of the "image width resolution" and the "image height resolution". However, the present teaching is not limited to such configuration but, for example, it may also be configured so that the read-in portion 40 scans a manuscript constantly with the same resolution without depending on the setting value of the "image width resolution", and that the image processing portion 41 converts it into the set resolution. This procedure can be also applicable to the process regarding the "image height resolution".

With respect to the "pixel configuration", the read-in portion 40 controls the color of the light source 25 to be lightened, according to either "color" or "gray scale". However, the present teaching is not limited to such configuration but, for example, it may also be configured so that in the case of gray scale, the read-in portion 40 also controls the light source 25 in the same manner as in the case of color, and the image processing portion 41 may convert the scanned color image data into a gray scale image data.

Further, the setting items included in the read-in condition may vary with the model of the multifunctional apparatus. The same is true on the setting items included in the image processing condition. Further, even though the read-in condition is for controlling the read-in portion 40 in the first embodiment, in some models of the multifunctional apparatuses, it may be the condition for controlling the image processing portion 41, and vice versa.

Further, even though a process is carried out by the read-in portion 40 in the first embodiment, in some models of the multifunctional apparatuses, it may be carried out by the controller 10 as well. In such a case, the read-in portion 40 is regarded as also including the controller 10. The same is true on a process carried out by the image processing portion 41.

<Image Processing Condition>

An example of setting values is shown below for the setting items included in the image processing condition.
1. Image width resolution (for example, 300 dpi, 600 dpi and 1,200 dpi);
2. Image height resolution (for example, 300 dpi, 600 dpi and 1,200 dpi);
3. Image width (for example, pixel number in the width direction);
4. Image height (for example, pixel number in the height direction);
5. Compression type (for example, non-compression, JPEG compression, LZW compression, ZIP compression and PackBits);
6. Image direction (for example, vertically long and horizontally long);
7. Brightness (for example, 0% to 100%);
8. Contrast (for example, 0% to 100%); and
9. Color balance (for example, 0% to 100%).

Among these setting items, the "compression type" does not correspond to the attribute of the PDF file. Further, the "brightness", "contrast", and "color balance" correspond neither to the attribute of the TIFF file nor to that of the PDF file.

Further, the image processing portion 41 may also carry out other image processes on the image data outputted from the read-in portion 40 such as a denoising process (a process for canceling noise), an edge enhancement process and, in such cases, the image processing condition may also include a parameter for those image processes.

<Storage Condition>

As shown in FIG. 5, in the first embodiment an operational condition is also set for the controller 10 per se, in addition to the image generation condition. The operational condition for the controller 10 per se is, in particular, a condition for storing the image data into the image file (storage condition).

An example of setting values is shown below for the setting items included in the storage condition.
1. Header and footer: on, off;
2. Watermark: on, off;
3. Thumbnail image: on, off; and
4. Recognized character (OCR): on, off.

Among the above setting items, the "thumbnail image" corresponds to the attributes of the TIFF file and the PDF file. On the other hand, the "header and footer", "watermark", and "character recognition" do not correspond to the attribute of the TIFF file.

The header and footer refers to the information (characters, illustrations, and the like) printed on the upper end portion and lower end portion of a recording medium when the image data is printed on the recording medium. When "on" is set in the "header and footer" of the storage condition, at the time of storing the scanned image data into the PDF file, the controller 10 acquires the "header and footer" information from other image data stored in the PDF file and stores the acquired information as the "header and footer" of the scanned image data. That is, the controller 10 also associates the information (characters, illustrations, and the like), which is associated with the other image data stored in the insertion destination PDF file as the attribute value of the "header and footer", with the scanned image data, and stores the same.

The watermark refers to a so-called watermarked image. When "on" is set in the "watermark" of the storage condition, the controller 10 acquires the watermarked image associated with other image data stored in the PDF file, that is a target of the insertion, as the attribute value of the "watermark", and the controller 10 associates the acquired watermarked image with the scanned image data too, and stores the same.

The recognized character (OCR) refers to the character strings rendered from the scanned image data through a character recognition process. When "on" is set in the "recognized character (OCR)" of the storage condition, at the time of storing the scanned image data into the PDF file, the controller 10 recognizes the character strings rendered by the image data, associates the recognized character strings with the scanned image data, and stores the same.

Further, the above information is optional, and thus may not be necessarily stored in the PDF file or the TIFF file. The information of the "header and footer" (characters, illustrations, and the like) and the watermarked image of the "watermark" are an example of the "attribute value unusable for setting the image generation condition".

<Methods for Setting the Image Generation Condition>

In the first embodiment, there are six types of methods: a "first setting method" to a "sixth setting method" which will be explained hereinbelow as the methods for setting the image generation condition according to the attribute values. The user is able to freely select any one of these setting methods.

<First Setting Method>

In the first setting method, each of the attribute values of the scanned image data is adapted to an attribute value of a page near an insertion page into which the scanned image data will be inserted (an example of a "a position or an address for adding the scanned image data"), for one of the setting items. For example, when "a second page" is designated as the insertion page into which the scanned image data will be inserted, then the scanned image data will be inserted between the current first page and the current second page in the destination image file. In this case, because the current first page and the current second page are the pages near the insertion page, the attribute values of the scanned image data are adapted to the attribute values of the current first page, or the current second page, or the both. The details of the first setting method will be described hereinafter.

Here, the expression "adapt to the attribute values" means that the setting items of the image generation condition is set to the attribute value of the corresponding attribute of the image data stored in the image file, or is set to a value in accordance with the attribute value of the corresponding attribute of the image data stored in the image file. For example, when the attribute value of the "image width resolution" of the image data stored in the image file is 600 dpi, then "600 dpi" (or a value in accordance with the attribute value) is set as the "image width resolution" of the image generation condition.

<Second Setting Method>

In the second setting method, each of the attribute values is adapted to an attribute value that appears the most frequently in the attribute values for one of the setting items. For example, suppose that "JPEG" appears the most frequently in the attribute values of the "compression type", and "color" appears the most frequently in the attribute values of the "pixel configuration", in the one or more image data stored in the TIFF file. In such case, "PEG" is set to the "compression type", and "color" is set to the "pixel configuration" for the image generation condition.

<Third Setting Method>

In the third setting method, an attribute value of a specific attribute is adapted to an attribute value nearest to a predesignated attribute value. In the third setting method, the attribute value is adapted to be processed at the highest speed.

Specifically, the image generation condition is set based on the attribute value of low image quality taken out of the attribute information stored in the destination image file. In this case, the time from the beginning of read-in to the end of storing the image data into the image file can be shortened.

Figure 6:
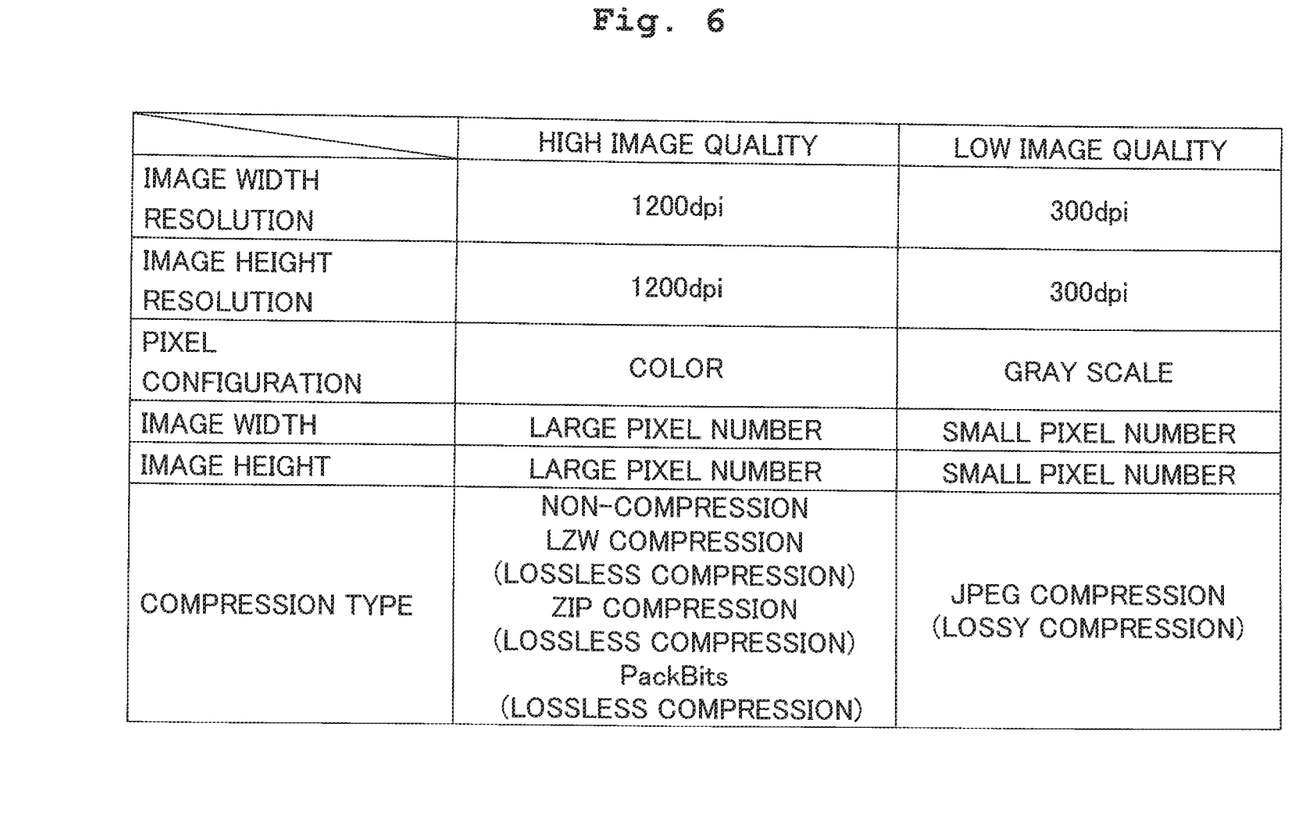
FIG. 6 is a table classifying an attribute value into either that of high image quality or that of low image quality.

FIG. 6 shows the "image width resolution", "image height resolution", "pixel configuration", "image width", "image height", and "compression type" as the "specific attributes".

According to FIG. 6, for example, between the case of setting "300 dpi" and the case of setting "1,200 dpi to the "image width resolution" for the image generation condition, the case of setting "300 dpi" is for the low image quality. Therefore, when the attribute values of the "image width resolution" includes "600 dpi" and "1,200 dpi" in the TIFF file, for example, the multifunctional apparatus 1 adapts the resolution to "600 dpi" Which is nearer to "300 dpi" to set the image generation condition.

Further, for example, the image quality of the case of a lossy compression such as JPEG compression is lower than that of the cases of non-compression, and a lossless compression such as LZW compression and the like. Therefore, when the TIFF file includes an image data of which attribute value of the "compression type" is "JPEG compression", then "JPEG compression" is set to the "compression type" for the image generation condition.

Further, with respect to attributes not shown in FIG. 6, the attributes may be selected in the same method as the "first setting method", "second setting method", "fifth setting method", or "sixth setting method". Further, the classification shown in FIG. 6 may vary with the model of the multifunctional apparatus. Anyway, in the first embodiment, whether or not the process is high-speed is determined according to the classification shown in FIG. 6. Further, with respect to attributes other than the attributes shown in FIG. 6, when the difference in attribute values causes a significant difference in the processing speed, such attribute values can also be included in the "specific attributes".

<Fourth Setting Method>

In the fourth setting method, an attribute value of a specific attribute is adapted to that nearest to a predesignated attribute value. In the fourth setting method, the attribute value is adapted to that of the highest image quality. In some cases, image data of non-compression and a plurality of types of lossless compressions may also be included in one TIFF file. In such cases, the attribute value may also be selected in the same method as the "first setting method", "second setting method", "fifth setting method", or "sixth setting method".

<Fifth Setting Method>

In the fifth setting method, the user selects any one of the attributes from those stored in the image file. An attribute value is selected by the user only with respect to the attribute of which value is different between the image data. With respect to the setting item corresponding to an attribute of which value is common between the image data, the common attribute value is set to the setting item.

Further, the user is only able to select an attribute value stored in the image file, but unable to select any attribute value not stored in the image file. For example, when the TIFF file includes image data of which attribute value of the "image width resolution" is either "300 dpi" or "1,200 dpi", then the user is unable to select "600 dpi".

<Sixth Setting Method>

In the sixth setting method, attribute values which are used for setting the image generation condition are determined based on the information rendering the time of storing of image data. In the sixth setting method, the attribute value is adapted to that of the page with the latest generated time (or date).

<Processes of the Multifunctional Apparatus>

Next, explanations will be made with respect to a process of the multifunctional apparatus 1, such as the "scanning and insertion process". Here, the explanations will be made with an example of inserting (adding) an image data into the image file stored in a USB memory connected to the USB interface 15 of the multifunctional apparatus 1.

<A Process Flow in the Multifunctional Apparatus 1>

Figure 7:
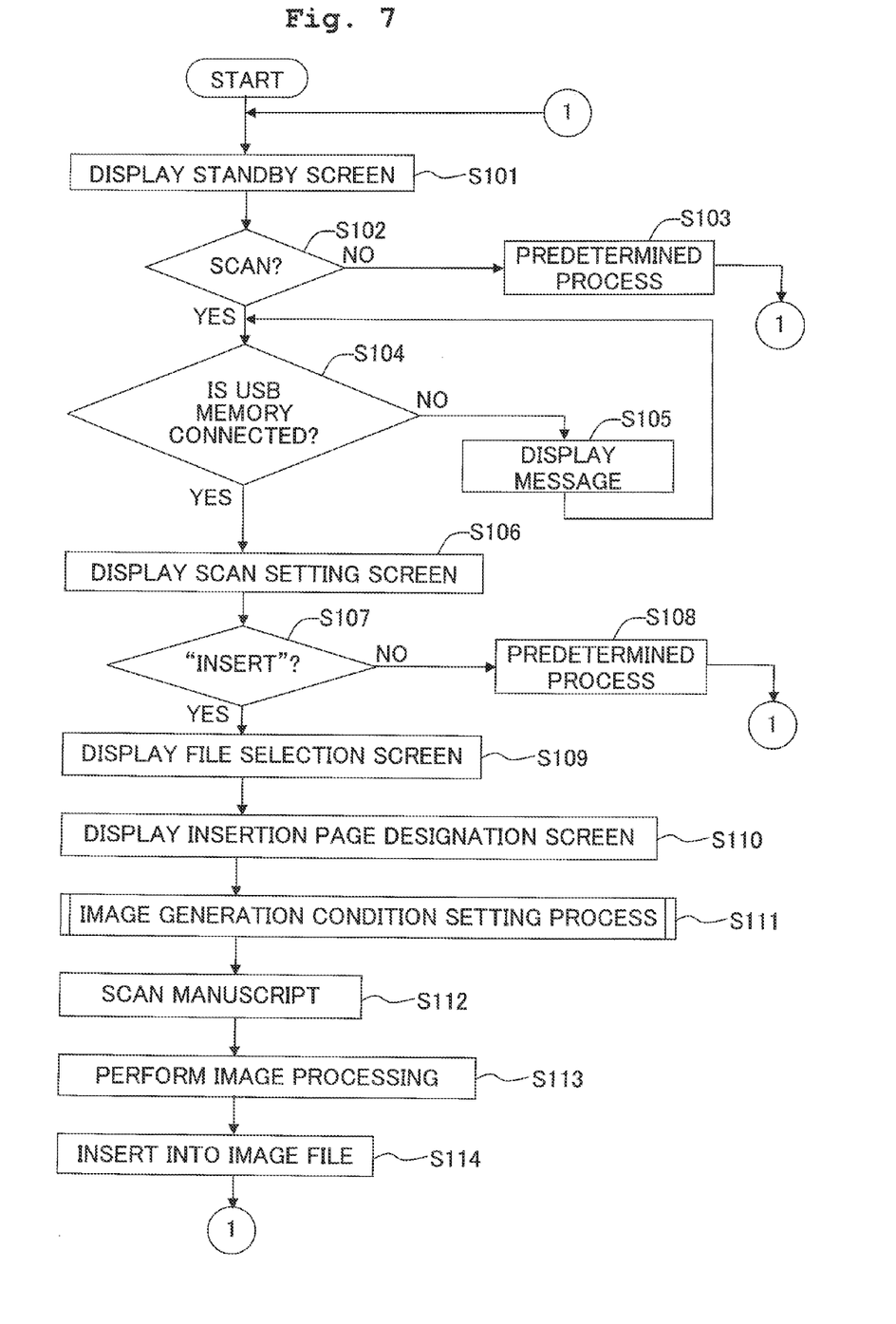
FIG. 7 is a flowchart showing a process flow of a multifunctional apparatus.

A process flow in the multifunctional apparatus 1 will be explained with reference to FIG. 7. The process is started as the multifunctional apparatus 1 is powered on. In the step S101, the controller 10 shows a predetermined standby screen on the display of the operation section 13. On this standby screen, the user is able to select any one of the functions such as "Print", "Scan", "Copy", and the like. The controller 10 stands by or waits until the user selects any one of the functions, and the process proceeds to the step S102 when any one of the functions has been selected.

In the step S102, when the selected function is not "Scan" (but is Print or Copy), the process proceeds to the step S103; when the selected function is "Scan", the process proceeds to the step S104. In the step S103, the controller 10 carries out a predetermined process in accordance with the selected function and the process returns to the step S101.

In the step S104, the controller 10 determines whether or not the USB memory is connected to the USB interface 15. When the USB memory is not connected to the USB interface 15, the process proceeds to the step S105; when the USB memory is connected to the USB interface 15, the process proceeds to the step S106. In the step S105, the controller 10 displays a message for urging to insert the USB memory and the process returns to the step S104.

In the step S106, the controller 10 shows a scan-setting screen on the display for the user to set the image generation condition. On the scan-setting screen, a selection item is also displayed for the user to select items of "insert the scanned image into an existing file"/"not insert the scanned image into an existing file", in addition to the setting items for the image generation condition. When the user selects the item of "insert the scanned image into an existing file", the setting items for the image generation condition are displayed in grayout. Thereby, it is not possible to set the image generation condition on the scan setting screen. When the user selects the item of "insert the scanned image into an existing file", the user should press the setting-completion button without setting the image generation condition.

On the other hand, when the user selects the item of "not insert the scanned image into an existing file", it is possible to set the image generation condition on the scan setting screen. When the use selects the item of "not insert the scanned image into an existing file", the user presses the setting-completion button after setting the image generation condition. Further, the storage condition is not set on the scan setting screen, because the storage condition is not used in the case of selecting the item of "not insert the scanned image into an existing file".

In the step S107, the controller 10 judges whether or not the item of "insert the scanned image into an existing file" has been selected. When the item of "not insert the scanned image into an existing file" has been selected, the process proceeds to the step S108; when the item of "insert the scanned image into an existing file" has been selected, the process proceeds to the step S109.

In the step S108, the controller 10 carries out a predetermined process which is prepared for the case of "not insert the scanned image into an existing file". The predetermined process includes a step of generating an image data based on the aforementioned image generation condition set in the step S106, and a step of storing the generated image data in a new image file.

In the step S109, the controller 10 shows a file selection screen on the display for the user to select a destination image file into which the image data will be inserted. On the file selection screen, the user is able to select an existing file stored in the USB memory (a TIFF file, or a PDF file). The controller 10 stands by until an existing file is selected, and the process proceeds to the step S110 when the selection has been completed.

In the step S110, the controller 10 shows an insertion page designation screen on the display for the user to designate a page into which the scanned image data will be inserted (an insertion position). For example, the user designates "the first page", when the user desires to insert the image data before the first page; the user designates "the second page", when the user desires to insert the image data between the first page and the second page; or the user designates "the end of the file", when the user desires to insert the image data after the last page. The controller 10 stands by until the insertion page is designated by the user, and the process proceeds to the step S111 when the designation has been completed.

In the step S111, the controller 10 carries out an "image generation condition setting process" in which the image generation condition and the storage condition are set according to the attribute values stored in the image file (existing file) selected in the step S109. The details of the "image generation condition setting process" will be described hereinafter.

In the step S112, the controller 10 controls the read-in portion 40 to scan the manuscript. This control is carried out based on "the condition for controlling the read-in portion 40 (read-in condition)" in the image generation condition set in the step S111. In the step S113, the controller 10 controls the image processing portion 41 to carry out an image-processing on the image data outputted from the read-in portion 40 (image processing). This control is carried out based on "the condition for controlling the image processing portion 41 (image processing condition)" in the image generation condition set in the step S111.

In the step S114, the controller 10 associates the image data to which the image-processing has been applied with the attribute values according to the image generation condition, and inserts (additionally stores) the associated image data into the existing file selected in the step S109 at a position before the insertion page designated in the step S110. In the insertion, when the image file is a TIFF file, and when the "thumbnail image" of the storage condition set in the step S111 is "on", then the controller 10 also stores the thumbnail image. In the same manner, when the image file is a PDF file, the controller 10 also stores the information of the "header and footer", "watermark", "thumbnail image", and "recognized characters (OCR)" according to the storage condition.

<An Image Generation Condition Setting Process>

Next, explanations will be made with respect to the aforementioned "image generation condition setting process". Here, an example in which the "first setting method" is selected as the method for setting the image generation condition will be explained below with reference to FIG. 8. Further, the process flows should be changed appropriately in the "second to sixth setting methods", but substantially, there is little difference in the process flows in each of the methods.

Therefore, detailed explanations for the process flows of the "second to sixth setting methods" will be omitted.

Figure 8:
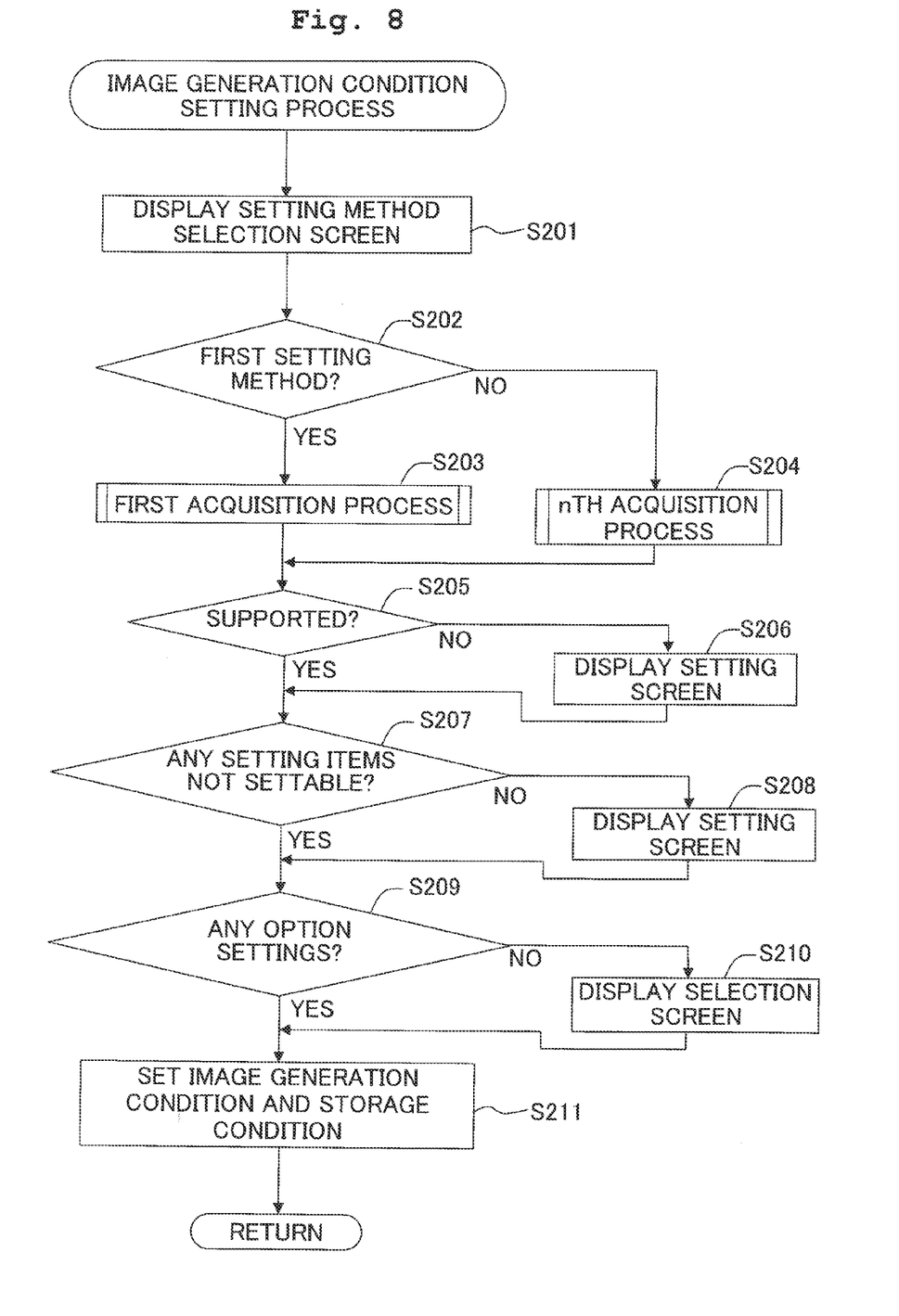
FIG. 8 is a flowchart showing a flow of an image generation condition setting process.

As shown in FIG. 8, in the step S201, the controller 10 shows a setting method selection screen on the display for the user to select any one of the "first setting method" to "sixth setting method" described hereinbefore. The controller 10 stands by until the user selects any one of the setting methods, and the process proceeds to the step S202 when any one of the setting methods has been selected.

In the step S202, the controller 10 determines whether or not the "first setting method" is selected, and the process proceeds to the step S203 when the "first setting method" has been selected. Otherwise, the process proceeds to the step S204. In the step S203, the controller 10 carries out a "first acquisition process" to acquire the attribute values from the image file according to the "first setting method". The details of the "first acquisition process" will be described hereinafter.

in the step S204, the controller 10 carries out any one of a "second acquisition process" to a "sixth acquisition process" according to the setting method other than the "first setting method" (the second to sixth setting methods). Explanations will be omitted for the "second acquisition process" to "sixth acquisition process".

In the step S205, the controller 10 determines whether or not the scanner section 11 supports the acquired attribute values. Specifically, for example, the image data stored in an existing file are not necessarily limited to those generated by the multifunctional apparatus 1, but image data generated by another scanner may also be stored. In such a case, for example, the other scanner may support the resolution of "2,400 dpi", and thus the acquired attribute value of the "image width resolution" may be "2,400 dpi". Nevertheless, the "image width resolution" supported by the scanner section 11 of the first embodiment is "300 dpi", "600 dpi", and "1,200 dpi". Therefore, the resolution of "2,400 dpi" is not supported by the scanner section 11.

When at least one attribute value unsupported by the scanner section 11 is included in the acquired attribute values, the process proceeds to the step S206. When all of the attribute values are supported by the scanner section 11, the process proceeds to the step S207.

In the step S206, the controller 10 shows a setting screen on the display for the user to set setting values of the setting items corresponding to the attributes for which the attribute values unsupported by the scanner section 11 are set. The controller 10 stands by with the setting screen until the user sets the setting values, and the process proceeds to the step S207 when the user has set the setting values.

In the step S207, the controller 10 determines whether or not a setting item which can not be set according to the attribute value acquired from the existing file is included in the setting items of the image generation condition. When the setting item which can not be set according to the attribute value acquired from the existing file is included, the process proceeds to the step S208; when the setting item which can not be set according to the attribute value acquired from the existing file is not included, the process proceeds to the step S209.

As described hereinbefore, the image generation condition of the first embodiment includes the setting items which do not correspond to the attributes of the TIFF file and the PDF file (the "brightness", "contrast", "color balance", and the like), and these setting items can not be set according to the attribute values acquired from an existing file. In such cases, the process proceeds to the step S208 at all times. However, in some models of the multifunctional apparatus, setting items which can not be set according to the attribute values acquired from an existing file may not be included in the setting items of the image generation condition. In such cases, the process proceeds to the step S209.

In the step S208, the controller 10 shows a setting screen on the display for the user to set the setting items which can not be set according to the attribute values acquired from the existing file. The controller 10 stands by with the setting screen until the user sets the setting values, and the process proceeds to the step S209 when the user has set the setting values.

In the step S209, the controller 10 determines whether or not there are any option settings. For example, in the case of the PDF file, the phrase "there are option settings" means that the attribute values of the "header and footer", "watermark", "thumbnail image" and "recognized characters (OCR)" are stored in the insertion destination PDF file. In the case of the TIFF file, the phrase "there are option settings" means that the attribute value of the "thumbnail image" is stored (that is, the thumbnail image is stored) in the insertion destination TIFF file.

When at least one of the attribute values of the "header and footer", "watermark", "thumbnail image" and "character recognition (OCR)" is stored in the insertion destination PDF file, the controller 10 determines that there are option settings, and the process proceeds to the step S210; when such attribute values are not stored, the process proceeds to the step S211.

In the step S211, the controller 10 shows a selection screen on the display for the user to select whether or not to carry out the option settings. On the selection screen, the user is able to select whether or not to carry out the option setting ("on" or "off") for some setting items, of which attribute values are stored in the existing file, among the setting items of the "header and footer", "watermark", "thumbnail image", and "recognized characters (OCR)". The controller 10 stands by with the selection screen until the user selects whether or not to carry out the option setting, and the process proceeds to the step S211 when the selection has been completed.

In the step S211, the controller 10 sets the image generation condition according to the attribute values acquired from the existing file and those selected by the user and, at the same time, the controller 10 sets the storage condition according to the selections of whether or not to carry out the option settings.

<First Acquisition Process>

Figure 9:
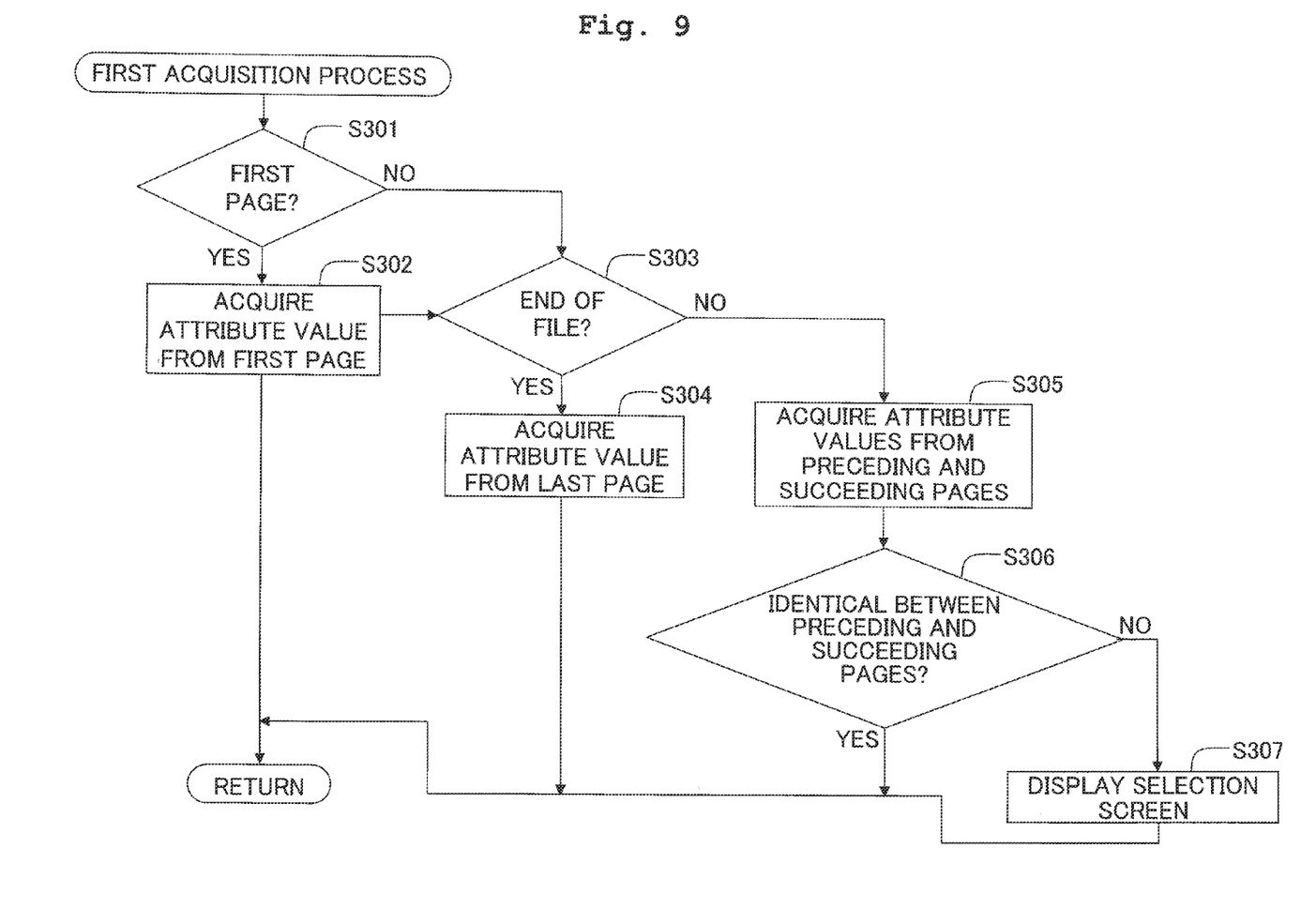
FIG. 9 is a flowchart showing a flow of a first acquisition process.

As shown in FIG. 9, in the step S301, the controller 10 determines whether or not the insertion page designated by the user is "the first page". When "the first page" is designated, the step proceeds to the step S302; otherwise the step proceeds to the step S303.

In the step S302, the controller 10 acquires the attribute value of each attribute from the first page of the existing file. In the step S303, the controller 10 determines whether or not the insertion page is "the end of the file". When the insertion page is designated as the end of the file, the process proceeds to the step S304; otherwise the process proceeds to the step S305.

In the step S304, the controller 10 acquires the attribute value of each attribute from the last page of the existing file. In the step S305, the controller 10 acquires the attribute value of each attribute from the preceding and succeeding pages before and after the insertion page of the existing file.

In the step S306, the controller 10 determines whether or not the attribute values are identical between the preceding and succeeding pages with respect to each attribute. When the attribute values are identical between the preceding and succeeding pages with respect to all the attributes, the controller 10 ends the process and the process returns to the "image generation condition setting process"; when there is at least one attribute of which value is not identical between the preceding and succeeding pages, the process proceeds to the step S307.

In the step S307, the controller 10 shows a selection screen on the display for the user to select from two options, regarding the attributes of which values are different between the preceding and succeeding pages. In the first option, the attribute values are acquired from the preceding page, and in the second option, the attribute values are acquired from the succeeding page. The controller 10 stands by until the user selects from the options, and ends the process to returns to the "image generation condition setting process" when either of the options has been selected.

Further, the above explanation was made with the example in which the user selects from the preceding page and the succeeding page. However, it is also possible to carry out the selection of acquiring the attribute value from either of the preceding and succeeding pages by the same method as the "third setting method", the "fourth setting method", or the "sixth setting method".

According to the multifunctional apparatus 1 in accordance with the first embodiment of the present teaching as explained hereinabove, in the case of scanning the manuscript to generate an image data, and inserting or adding (additionally storing) the scanned image data into an existing image file, the image generation condition is set according to the attribute values of the image data stored in the destination image file into which the scanned image data will be inserted. Therefore, it is possible to adapt the image quality of the inserted image data to that of the image data stored in the image file. By virtue of this, it is possible to reduce the problems caused by storing the image data different in attribute values in one image file.

In particular, for example, suppose that the "image width resolutions" of the image data originally stored in the image file are all "1,200 dpi", and that an image data with the resolution of "300 dpi" is inserted into the image file by the multifunctional apparatus 1. In such a case, variance may occur in image quality ("image width resolution" in this case) at the time of displaying the image data stored in the image file, and thus may bring a sense of incongruity to the user. According to the multifunctional apparatus 1, since any image resolutions which are different from those originally stored in the image file can not be set, it is possible to diminish such kind of incongruity (discordance). The same is true on the "image height resolution", "image width", "image height", "image direction", and the like.

Further, for example, suppose "JPEG compression" is the "compression type" of the image data stored in the original image file, and the application utilized to display the original image file is incompatible with LZW compression. In such a case, if the scanned image data is "LZW compressed", there is such discordance or inconvenience as it becomes no longer possible to utilize the application as it has been utilized so far. However, according to the multifunctional apparatus 1, since no compressions are made with a compression type which is not used originally in the image file, it is possible to diminish such kind of discordance.

Further, according to the multifunctional apparatus 1, when the original image file is a PDF file, since the scanned image data is also associated with the information of the "header and footer" (characters, illustrations, and the like) and the watermarked image of the "watermark" of the image data stored in the original image file, it is possible to print or display the header, footer, and watermarked image too with the scanned image data in the same manner as the other image data. By virtue of this, it is possible to diminish the incongruity (discordance) brought to the user because of not printing or displaying those items only with the scanned image data inserted by the multifunctional apparatus 1.

Further, when the "first setting method" is selected, the multifunctional apparatus 1 sets the image generation condition according to the attribute values of the image data stored within a reference range (from the preceding one page to the succeeding one page, for example) from the position of inserting the image data (the insertion page). Therefore, it is possible to adapt the image quality of the inserted image data to that of the image data within that reference range. By virtue of this, it becomes difficult for the user to be aware of the variance in image quality.

Further, when the "second setting method" is selected, the multifunctional apparatus 1 sets the image generation condition according to the attribute value that appears the most frequently among a plurality of attribute values. Therefore, it becomes difficult for the user to be aware of the variance in image quality.

Further, when the "third setting method" or "fourth setting method" is selected, the multifunctional apparatus 1 sets the image generation condition according to the attribute value nearest to a predetermined attribute value (attribute value of high speed or attribute value of high image quality) among a plurality attribute values. Therefore, when the image file has stored a plurality of image data different in attribute value from each other, it is possible to determine to set the image generation condition according to any one of the attribute values.

Further, when the "fifth setting method" is selected, the multifunctional apparatus 1 lets the user select to set the image generation condition according to any one attribute value among a plurality of attribute values. Therefore, when the image file has stored a plurality of image data different in attribute value from each other, it is possible to determine to set the image generation condition according to any one of the attribute values.

Further, when the "sixth setting method" is selected, the multifunctional apparatus 1 sets the image generation condition according to the attribute values of the page with the latest generated time and date. Therefore, when the image file has stored a plurality of image data different in attribute value from each other, it is possible to determine to set the image generation condition according to the attribute values of the page with the latest generated time and date.

Further, when the image generation condition is not settable according to the attribute values of the image data stored in the image file (when the "image width resolution" is 2,400 dpi, for example), the multifunctional apparatus 1 lets the user set the image generation condition within a settable range. By virtue of this, it is possible to set the image generation condition within the settable range.

Further, with the multifunctional apparatus 1, the user is able to set the image generation condition which is not settable with the attribute values acquired from the image file (the "brightness", "contrast", "color balance", "gamma correction", and the like).

The present invention is not limited to the first embodiment explained through the above descriptions and drawings but, for example, the following embodiments and appropriate combinations of all these embodiments are also included in the technical scope of the present teaching.

In the first embodiment, the explanations were made with the example of inserting the image data into an image file stored in a USB memory. However, the image data may also be inserted into an image file stored in an external computer (a file server or the like) communicably connected with the multifunctional apparatus 1. In such a case, instead of the steps S104 and S105, the following process may be carried out. First, the multifunctional apparatus 1 lets the user designate the network address of the external computer (or may also let the user select any one of the computers communicably connected with the multifunctional apparatus 1). Then, the controller 10 determines whether or not the external computer at the designated network address is communicably connected with the multifunctional apparatus 1. When it is connected, the process proceeds to the step S106; if it is not connected, the controller 10 may let the user designate the network address again. When the image data is to be inserted into an image file stored in the external computer (the file server or the like), in the step S109, the controller 10 shows a selection screen of the existing files stored in the computer at the network address designated by the user.

In the first embodiment, the explanations were made with the example of setting both the condition for controlling the read-in portion 40 and the condition for controlling the image processing portion 41 according to the attribute values. However, it is also possible to set only one of the condition for controlling the read-in portion 40 and the condition for controlling the image processing portion 41 according to the attribute values, and let the user set the other regardless of whether or not it has attribute values.

In the first embodiment, the explanations were made with the example of storing the image data generated with the multifunctional apparatus 1 into a USB memory. However, the present invention may also be realized by a seamier driver executed on a computer communicably connected with the multifunctional apparatus 1. In such a case, the read-in condition and image processing condition are set on the computer to control the multifunctional apparatus 1 to generate the image data based on the read-in condition. Then, the computer acquires the generated image data from the multifunctional apparatus 1, processes the image data based on the image processing condition, and inserts the same into an existing file.

In the first embodiment, the explanations were made with the example of a multifunctional apparatus as the image scanning apparatus. However, the image scanning apparatus may also be a monofunctional image scanner with a scanning function only.

What is claimed is:

1. An image scanning apparatus comprising:
a storage section configured to store existing image data associated with an attribute value of the existing image data;
a controller configured to:
specify an address in the existing image file;
set an image generation condition based on the attribute value of the existing image data stored within a reference range from the specified address in the existing image file;
scan a document;
generate scanned image data based on the image generation condition set based on the attribute value of the existing image data; and
add the scanned image data generated based on the image generation condition into the existing image file stored in the storage section,
wherein the controller sets the image generation condition based on at least one of an attribute value of the existing image data at an address immediately before the specified address and an attribute value of the existing image data at an address immediately after the specified address.

2. The image scanning apparatus according to claim 1, wherein the controller is configured to:
scan the document to output the scanned image data; and
perform image processing on the outputted scanned image data,
wherein the image generation condition includes one of a condition for controlling the read-in portion and a condition for controlling the image processing portion.

3. The image scanning apparatus according to claim 1, wherein the controller is configured to:
acquire another attribute value unusable for setting the image generation condition from the existing image data stored in the image file;
associate the generated scanned image data with the attribute value according to the image generation condition and the other attribute value unusable for setting the image generation condition; and
add the associated scanned image data into the image file to store the added image file.

4. The image scanning apparatus according to claim 1, wherein the existing image data includes a plurality pieces of existing image data associated with a plurality of attribute values, respectively, and
under a condition that the plurality of attribute values of the existing image data stored in the image file are different from each other, the controller sets the image generation condition based on an attribute value which appears the most frequently in the plurality of attribute values.

5. The image scanning apparatus according to claim 1, wherein the existing image data includes a plurality pieces of existing image data associated with a plurality of attribute values, respectively, and
under a condition that the plurality of attribute values of the existing image data stored in the image file are different from each other, the controller sets the image generation condition based on an attribute value which is the nearest to a predesignated attribute value among the plurality of attribute values.

6. The image scanning apparatus according to claim 1, wherein the existing image data includes a plurality pieces of existing image data associated with a plurality of attribute values, respectively,
the image file includes information rendering a time at which each of the existing image data is stored, and
under a condition that the plurality of attribute values of the existing image data stored in the image file are different from each other, the controller sets the image generation condition based on an attribute value, which is determined based on the time at which each of the image data is stored, among the plurality of attribute values.

7. The image scanning apparatus according to claim 1, wherein the existing image data includes a plurality pieces of existing image data associated with a plurality of attribute values, respectively, and
under a condition that the plurality of attribute values of the existing image data stored in the image file are different from each other, the controller lets a user select an attribute value among the plurality of attribute values.

8. The image scanning apparatus according to claim 1, wherein under a condition that the image generation condition which meets the attribute value of the existing image data stored in the image file cannot be set, the controller allows a user to set the image generation condition within a settable range.

9. The image scanning apparatus according to claim 1, wherein the controller allows a user to set the image generation condition which cannot be set with the attribute value acquired from the image file.

10. A non-transitory computer readable medium in which a scanner driver to be executed on a computer communicably connected with an image scanning apparatus for scanning a document and outputting a scanned image data is stored, the scanner driver causing the computer to perform the processes of:

a specifying process in which an address is specified in the existing image file;

a setting process in which an attribute value is acquired from an image file storing existing image data that is associated with an attribute value of the existing image data and is stored within a reference range from the specified address in the existing image file, and a read-in condition and an image processing condition based on the acquired attribute value is set;

a control process in which the image scanning apparatus is controlled to output a scanned image data based on the read-in condition;

an image process in which the scanned image data outputted from the image scanning apparatus is processed based on the image processing condition; and a storage process in which the scanned image data processed by the image process is added into the image file, wherein the image generation condition is set based on at least one of an attribute value of the existing image data at an address immediately before the specified address and an attribute value of the existing image data at an address immediately after the specified address.

11. An image storing method for adding a scanned image data generated through scanning of a document into an image file storing existing image data associated with an attribute value, the method comprising the steps of:

specifying an address in the existing image file;

setting an image generation condition based on the attribute value of the existing image data stored within a reference range from the specified address in the image file;

generating the scanned image data through scanning of the document based on the set image generation condition; and adding the scanned image data generated in the step of generating the scanned image data into the image file, wherein the image generation condition is set based on at least one of an attribute value of the existing image data at an address immediately before the specified address and an attribute value of the existing image data at an address immediately after the specified address.

* * * * *